United States Patent [19]

Weiss et al.

[11] Patent Number: 4,897,840
[45] Date of Patent: Jan. 30, 1990

[54] METHOD AND APPARATUS FOR CONTROLLING THE ERROR CORRECTION WITHIN A DATA TRANSMISSION CONTROLLER GIVEN DATA READ FROM MOVING PERIPHERAL STORAGES, PARTICULARLY DISK STORAGES, OF A DATA PROCESSING SYSTEM

[75] Inventors: Eckardt Weiss, Munich; Peter Wentzel, Augsburg, both of Fed. Rep. of Germany

[73] Assignee: Siemens Aktiengesellschaft, Berlin and Munich, Fed. Rep. of Germany

[21] Appl. No.: 166,391

[22] Filed: Mar. 10, 1988

[30] Foreign Application Priority Data

Mar. 10, 1987 [DE] Fed. Rep. of Germany ....... 3707680

[51] Int. Cl.$^4$ ............................................. G06F 11/10
[52] U.S. Cl. .................................................. 371/40.1
[58] Field of Search ............................. 371/38, 39, 40

[56] References Cited

U.S. PATENT DOCUMENTS

| | | | |
|---|---|---|---|
| 4,604,750 | 8/1986 | Manton et al. | 371/38 |
| 4,617,660 | 10/1986 | Sakamoto | 371/38 |
| 4,625,273 | 11/1986 | Woffinden et al. | 371/38 |
| 4,672,612 | 6/1987 | Shishikura et al. | 371/38 |

Primary Examiner—Charles E. Atkinson
Attorney, Agent, or Firm—Hill, Van Santen, Steadman & Simpson

[57] ABSTRACT

In order to reduce the time losses that arise when reading a plurality of successive data blocks, because of the interruption of the read operation in the case of recognized data errors, all required data blocks are read in one pass and are transferred into a correspondingly enlarged buffer memory (DAT-SP). Error syndromes (ES) resulting from the recognized data errors are initially intermediately stored in allocation to the erroneous data, until a correction of the data in the data memory (DAT-SP) is possible.

11 Claims, 2 Drawing Sheets

METHOD AND APPARATUS FOR CONTROLLING THE ERROR CORRECTION WITHIN A DATA TRANSMISSION CONTROLLER GIVEN DATA READ FROM MOVING PERIPHERAL STORAGES, PARTICULARLY DISK STORAGES, OF A DATA PROCESSING SYSTEM

BACKGROUND OF THE INVENTION

1. Field of the Invention

The invention is directed to a method and apparatus for controlling error correction within a data transmission controller for reading data from a moving peripheral storage device, particularly a disk storage device, of a data processing system.

Peripheral storages such as, for example, disk storage devices in a data processing system are usually controlled be data transmission controllers which control the connection of the disk storage device to the input-/output channels of the data processing system. In order to facilitate the cooperation between the input-/output channels and the various peripheral stores, and to design this in more adaptable fashion, various interfaces have been created on the route between the input-/output channels and the peripheral stores. These interfaces have been partially elevated to the status of standards—see, for example, "MINI-MICRO SYSTEMS", Feb., 1985, pages 135 through 144 and "Computer Design", Jan. 15, 1986, pages 57 through 70.

On the other hand, the high packing density of modern peripheral stores requires an adequate protection of the data with error-correcting codes, such as parity codes, CRC codes and the like, in order to assure an adequate data transmission performance. The data are thereby usually divided into blocks or data fields that can differ in length, and every block is supplemented during writing by protection characters corresponding to the selected error correction codes such as parity codes, CRC codes, and the like. When reading the blocks, the protection characters are then formed independently again, and are compared to the entrained supplemental protection characters. When the protection characters do not agree because the data have been falsified, an error syndrome is identified from which the correction quantities for correcting the error-infested data can be calculated. Dependent on the scope of the maximum data to be protected, and dependent on the scope of the correctability of errors, every error causes a more or less great time delay until faulty data are corrected and can be forwarded to the data processing system. The protection of the data to be stored and their monitoring and correction during reading is likewise a job of the controller.

Known solutions employ two data buffers whose capacity corresponds to a standard block length, such as a single cluster unit comprising one or more disk segments. Whereas reading is carried out in one data buffer, the data in the other data buffer are forwarded to the higher-ranking data processing system. When an error is identified, the reading of a further block is suppressed and the faulty block is first corrected—see, for example, "Electronic Design", Oct. 3, 1985, pages 105 through 111.

Considerable delays result, after every block or segment which is recognized as faulty, since the correction generally requires significantly more time than is required for reaching the start of the following block on the disk storage device. With every adulterated block, the duration of one revolution of the storage disk in order to be able to read the following block, then represents lost time. These lost times are all the more significant the higher the number of blocks to be read with a single read instruction.

These lost times could be largely avoided if two separate protection and correction devices were provided in addition to the two data buffers and if the time conditions dependent on one another were matched better to one another. This, however, first means an additional expense and complexity and, because of the time conditions to be observed, means a restriction in the design of the apparatus that cannot always be accepted.

SUMMARY OF THE INVENTION

It is therefore an object of the invention to control the error correction in such a controller such that the time losses can be kept optimally low.

For the method of the invention, this object is achieved by using a single but significantly larger data buffer memory, this being capable of accepting all data blocks which can be read during a single read instruction. These data blocks are read into the buffer in one pass, without interruption, regardless of whether recognized errors are present or not.

As was hitherto standard, the data are monitored for the existence of errors and the error syndromes are generated simultaneously with the transfer of the data from the disk storage device into the data buffer memory. However, the read operation is no longer aborted in the case of a recognized error and the appertaining block is no longer corrected first before further reading. Rather, the identified error syndromes are likewise intermediately stored and the correction is thus postponed to a later, more favorable point in time, after all of the data called for by the read instruction has been read and stored in the buffer.

Developments of the invention are directed to the calculation of the correction quantities and of the execution of the correction, to the cooperation of buffer memory and protection and correction means as well as to the intermediate storage of the error syndromes.

In another development of the invention, a further buffer memory for the error syndromes, and devices for generating the necessary control signals are required, in addition to the enlarged buffer memory for the data. The data buffer memory may comprise two ports and separate read and write controls for the execution of overlapping or simultaneous read and write accesses, and the protection and correction unit may be composed of independent devices for the identification of error syndromes and for the execution of error corrections with reference to the error syndromes.

BRIEF DESCRIPTION OF THE DRAWINGS

Details of the invention will now be set forth in greater detail with reference to exemplary embodiments shown in the drawings, in which.

DESCRIPTION OF THE PREFERRED EMBODIMENT

Figure 1:
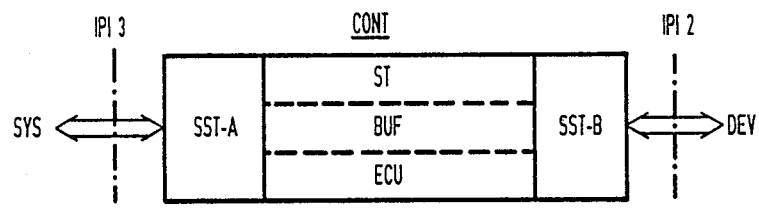
FIG. 1 is a block diagram of a disk storage control comprising its standardized interfaces.

Based on the illustration on page 70 of the "Computer Design", Jan. 15, 1986, FIG. 1 shows a block diagram of a disk storage controller CONT that is connected to the higher-ranking data processing system SYS via a standardized interface IPI3, whereas the peripheral storages are selected via the other, standardized interface IPI2. The coupling to these interfaces is effected by respective appropriately fashioned interface modules SST-A and SST-B that are connected to one another via a control part ST. Further, a buffer memory means BUF for the data to be transmitted in the one or in the other direction is coupled to a protection and correction means ECU with this control part ST and the two interface modules SST-A and SST-B.

Figure 2:
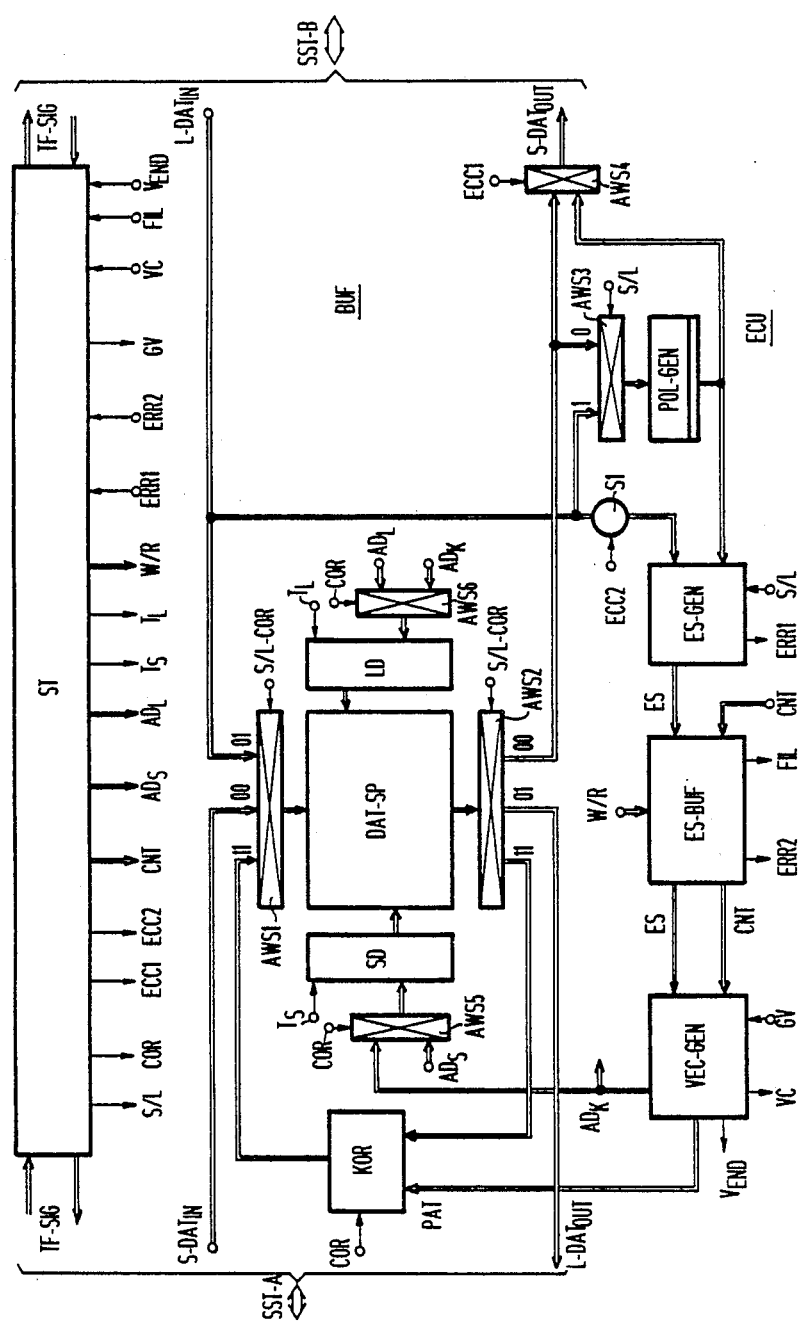
FIG. 2 is a fundamental circuit diagram of the buffer memory and of the protection and correction means of FIG. 1.

In the form of a block diagram, FIG. 2 shows the structure of the buffer memory means BUF and of the protection and correction means ECU as well as their interaction according to the invention in response to control signals of the control part ST. The core of the buffer memory device BUF for the data is the memory DAT-SP that can be selected via the selection switch AWS1, for writing data to be transmitted in both directions, whereby the write controller SD controls the writing into a prescribed memory section, dependent on supplied addresses $AD_S$ and write clock signals $T_S$. In the same way, data intermediately stored in the memory DAT-SP can be read out from a prescribed memory section in combination with the read controller LD, dependent on read addresses $AD_L$ and read signals $T_L$, and can be output to three different data line paths via the selection switch AWS2.

The selection switches AWS1 and AWS2 are set by the control signals S/L and COR supplied by the control part ST. With the signals S/L=0, for example, data S-DAT$_{IN}$ supplied from the system SYS via the interface module SST-A are written into the memory DAT-SP and are forwarded out of the latter to the disk storage via the interface module SST-B as data S-DAT$_{OUT}$. Inversely, data L-DAT$_{IN}$ read from the disk storage and supplied via the interface module SST-B are transferred into the memory DAT-SP with the setting signals S/L=1 and COR=0 for the selection switches AWS1 and AWS2 and are forwarded out of this memory DAT-SP to the system SYS via the interface module SST-A as data L-DAT$_{OUT}$. The third setting of the selection switches AWS1 and AWS2 with the signal COR=1 opens a correction path via the correction means KOR, so that error-infested data can be read out from the data memory DAT-SP and can be written back in after being corrected.

The protection and correction means ECU is coupled to the data paths leading to the disk storage. This means ECU is composed, for example, of a polynomial generator POL-GEN that generates the protection characters for the data set to be respectively protected, generating them from the supplied data in accord with the underlying error correction code. When data are transmitted to the disk storage, the out-going data path is coupled to the polynomial generator POL-GEN with the setting signal S/L=0, via the selection switch AWS3, and the generated protection characters are attached to the forwarded data S-DAT$_{OUT}$ by means of the selection switch AWS4, this being effected by the control signal ECC1. In the opposite transmission direction, read data L-DAT$_{IN}$ are likewise conducted to the polynomial generator POL-GEN given setting of the selection switch AWS3 with the control signal S/L=1. The protection characters generated in this case are conducted to the error syndrome generator ES-GEN together with the protection characters branched off from the data which have been read, which characters are available with the control signal ECC2 at the switch S1. In a known way, this error syndrome generator ES-GEN checks whether the data which have been read are error-infested, and may generate an error syndrome ES that enables the correction of the identified errors.

The error syndrome generator ES-GEN is followed in a known fashion by a vector generator VEC-GEN for calculating the correction quantities PAT for the individual data bit places and $AD_K$ for the identification of the respective data sections within the respective block and is also followed by a correction means KOR, so that the respectively involved data sections can be selected from the memory DAT-SP and can be conducted via the correction means KOR for correction and written back into the memory. Due to the respectively different address sources, the address feed for the write and read controls SD and LD is via selection switches AWS5 and AWS6 that are switched by the control signal COR=1, which is valid during the correction operation.

In further implementation of the invention, a buffer memory ES-BUF for the identified error syndromes ES is provided between the error syndrome generator ES-GEN and the vector generator VEC-GEN, so that the correction phase need not be immediately initiated given an identified error, as was hitherto standard, but can be postponed to a later, more favorable point in time.

Since, however, an intermediately stored error syndrome always refers to a specific data block, an allocation identification character CNT must be also stored in this case, this serving as a base address to which an offset or local address, calculated by the vector generator VEC-GEN can attach in order to obtain the actual address $AD_K$ for the individual memory sections in the memory DAT-SP that are to be corrected. For the sake of simplicity, this address modification is shown incorporated into the vector generator VEC-GEN.

The cycle for the buffer memory means BUF and for the protection and correction means ECU is determined in a known way by control signals and control information of the control part ST that are derived in a standard way from the supplied transfer signals and information TF-SIG. These are the control signal S/L for writing or reading data of the disk storage that defines the transmission direction, the write or read clock $T_S$ and $T_L$, respectively, and the addresses $AD_2$ and $AD_L$, respectively, connected therewith, as well as the control signals ECC1 and ECC2 for overlaying the protection characters when writing, and for extracting them during reading. All remaining control signals are a consequence of identified errors.

When the error syndrome generator ES-GEN identifies an error, it calculates an error syndrome ES, then it reports this with the signal ERR1 to the control part ST that, in response thereto, initially reacts with a transfer signal W for the buffer memory ES-BUF. The signal ERR2 is produced to indicate that at least one error syndrome ES is intermediately stored. When the buffer memory ES-BUF that is expediently fashioned as a FIFO memory is filled, then a signal FIL can be generated as a safeguard. In combination with another signal ERR1 of the error syndrome generator ES-GEN, this signal can then initiate the control part ST to interrupt the ongoing read operation, because subsequent error syndromes can no longer be intermediately stored. An adequate storage capacity for the error syndrome memory ES-BUF, however, can make such an operating case impossible.

When the end of the read operation has been reached and the signal ERR2 is present, then the first intermediately stored error syndrome ES is transferred out of the buffer memory ES-BUF to the vector generator VEG-GEN with the signal R and the signal GV initiates the latter to generate correction quantities whose presence is reported to the control part ST with the signal VC. A switch to the following correction phase is then undertaken with the control signal COR produced by the control part ST in response thereto.

This correction phase usually covers a prescribed plurality of read/write cycles for the data memory DAT-SP in order to read the data to be corrected and to write them back in. Otherwise, an additional signal $V_{END}$ can indicate that the correction quantities have all been processed or worked off. After the resetting of the signal COR, the entire correction operation is repeated with the following error syndrome given the continued presence of the signal ERR2 until all intermediately stored error syndromes are processed. The disappearance of the signal ERR2 ultimately informs the control part ST that all faulty data in the memory DAT-SP are corrected and the intermediately stored data can be forwarded in sequence in a continuous data flow, this being effected in a known way by the read address $AD_L$ incremented in steps in combination with a respective read pulse $T_L$. When the data memory DAT-SP is empty, the controller is available for the execution of further write or read instructions of the higher-ranking system SYS.

In comparison to the known solutions, thus, the signal ERR1 does not interrupt the read operation for the following data block and does not immediately initate the correction operation; rather, it merely triggers an intermediate storage signal W for the buffer memory ES-BUF. What are also new in this context are the control signals FIL, R, W and the signal GV normally directly derived from the signal ERR1.

The operating mode set forth above, to first read all data for a read instruction, and then successively to edit the error syndromes and to correct the faulty data before the forwarding of the intermediately stored data is initiated, is the operating mode that is simplest to control. It is especially necessary when the individual units of the protection and correction means ECU cannot work independently of one another but are combined in a single module as an integral component part having multiple exploitation of some components, for example for the calculation of the error syndromes ES and of the correction quantities PAT and $AD_K$. However, it is not necessary to postpone the forwarding of the data until all intermediately stored data have been corrected. If the system allows it, corrected sub-sets can be respectively forwarded as soon as they are corrected. A separation of write and read control SD and LD would also not be required in this case.

The employment of independent units within the protection and correction means ECU, as shown in the exemplary embodiment of FIG. 2, by contrast, opens up the possibility of a further time-saving since the calculation of the correction quantities by the vector generator VEC-GEN can be immediately initiated without interrupting the read operation as soon as the first error syndrome ES is identified. The overall time-delay up to the forwarding of the data is then shortened at least by the time required therefor, if the read operation has not already been concluded up to this point in time.

A further possibility for reducing time losses would derive if the calculated correction quantities were likewise intermediately stored, for example in the buffer memory ES-BUF instead of the appertaining error syndrome ES.

On the other hand, such an intermediate storage could be omitted, given corresponding marginal conditions, if the data normally serially read from the disk storage were converted portion-by-portion into a corresponding parallel representation in data units of, for example, the width of two bytes. The serial-to-parallel conversion connected therewith can be undertaken at any location in the transmission path between the disk storage and the input of the buffer memory DAT-SP. It is assumed with reference to the exemplary embodiment of FIG. 2 that the data are supplied and forwarded in such a parallel representation. Such a parallel conversion yields free times between the individual time spans for the write-in of the individual data units into the buffer memory DAT-SP, namely free times for insertable read and write operations for correcting faulty data with reference to the existing correction quantities, this also being facilitated by separate read and write controls LS and SD, respectively, as provided in the exemplary embodiment of FIG. 2.

Figure 3:
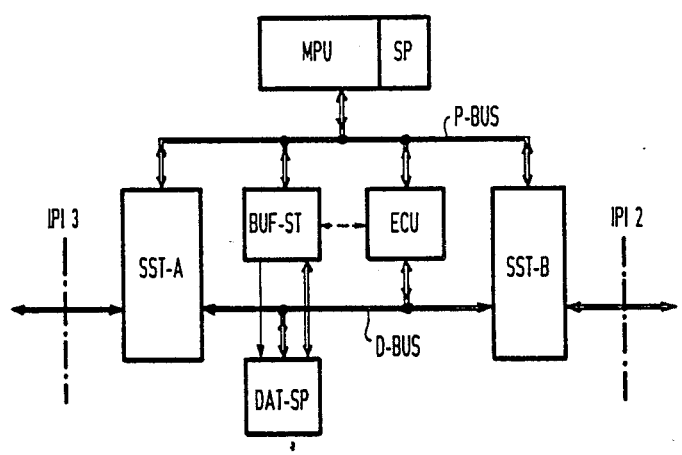
FIG. 3 is a block diagram of a disk storage control based on that of FIG. 1 given employment of a memory-programmed executive sequencer for the other function modules.

In comparison to FIG. 1, FIG. 3 shows a differently structured format of the disk storage control, employing a memory-programmed executive sequencer in the form of a microprocessor MPU having a main memory SP that monitors the work of all other function modules including the two interface modules SST-A and SST-B, and coordinates their cooperation. All illustrated modules with the exception of the actual data memory DAT-SP that is replaced by the appertaining control module BUF-ST are therefore connected to the microprocessor MPU via a processor line system P-BUS, whereas the data flow path between the interface modules SST-A and SST-B proceeds via a separate data line system D-BUS to which the buffer memory DAT-SP for the data is connected and to which the protection and control means ECU is likewise connected. The offering of addresses for the data memory DAT-SP thereby ensues exclusively via the memory controller BUF-ST, whereby an address exchange between this controller and the protection and correction means ECU is possible either via the processor line system P-BUS or, on the other hand, as indicated with broken lines, by a direct path.

The buffer memory for the error syndromes ES can thereby be integrated in the module of the protection and control means ECU. Another possibility of the invention comprises using a part of the main memory SP of the microprocessor MPU, whereby the protection and control means ECU offers every calculated error syndrome together with the allocation identifier only in a transfer register and reports the necessary transfer to the microprocessor MPU via a status register.

The same as set forth for the exemplary embodiment of FIG. 2 otherwise applies to the control of the error monitoring and correction. This is especially true of the division of the uniform module ECU into two separate modules for the calculation of the error syndromes and for the calculation of the correction quantities.

It will be apparent that various modifications and/or additions may be made in the method and apparatus of the invention without departing from the essential feature of novelty involved, which are intended to be defined and secured by the appended claims.

It is claimed:

1. A method for controlling error correction within a data transmission controller, said transmission controller controlling the transmission of data from a disk storage device to a data processing system, said data being recorded in said disk storage device in a plurality of blocks with check characters, said method comprising the steps of:

providing a buffer memory for intermediately storing data read from said disk storage device, in which recognized errors are corrected before the data are forwarded to said data processing system;

said buffer memory having a storage disk capacity corresponding to the maximum quantity of data that can be read from said disk storage device by a single read instruction;

successively transferring the data blocks read during a single read instruction into said buffer, without interruption, despite data errors that may be recognized;

calculating check characters in response to the data written into said buffer, while said data is being written;

comparing the calculated check characters with check characters transmitted from said disk storage device, and in response to a noncomparison of such check characters, forming an error syndrome corresponding to the recognized error; and intermediately storing said calculated error syndrome at a storage location allocated to the data containing the recognized error; and correcting the data within said buffer memory in response to said calculated error syndrome before said data is read out from said buffer memory to said data processing system.

2. The method according to claim 1, including the step of calculating correction quantities for the correction of said data stored in said buffer only after all of the data read from said disk storage device during a single read instruction has been stored in said buffer.

3. The method according to claim 2, including the step of calculating said error correction quantities, in response to said stored error syndromes.

4. The method according to either of claims 2 or 3, including the step of correcting the erroneous data stored in said buffer memory, immediately after the calculation of the correction quantities applicable to such data.

5. The method according to claim 3, including the step of providing means for reading and writing said buffer memory in parallel units of said data, and transferring said data in parallel between said buffer memory and a correction device, whereby erroneous data stored in said buffer memory is corrected.

6. A method according to any of the claims 1 through 3, including the step of correcting a subset of the data stored in said buffer, after all of the data read during a single read instruction is stored therein, and forwarding a corrected subset as soon as it has been corrected, before the remainder of the data is stored in said buffer memory has been corrected.

7. The method according to any of the claims 1 through 3, including the step of providing transfer units between said disk storage device and said buffer and between said buffer and said data processing system, an executive sequencer comprising a microprocessor with a main memory for controlling the transfer between said disk storage device and said buffer memory, and the transfer between said buffer memory and said data processing system, providing a data bus for interconnecting the data path from said disk storage device to said buffer memory and from said buffer memory to said data processing system, providing a correction device interconnected with said data bus whereby the data is transferred between said buffer memory and said correction device for the purpose of correcting data stored in said buffer which has recognized errors, and providing a control bus, separate from said data bus, for interconnecting said executive sequencer with said buffer, said correction unit, and said transfer units, and monitoring the operation of said transfer devices, said buffer memory, and said correction unit with said microprocessor without interferring with said data bus.

8. The method according to claim 7, including the step of storing, within said correction unit, error syndromes corresponding to recognized errors, together with an allocation identifier identifying the data to which said error syndrome is allocated within said correction unit.

9. The method according to claim 7, including the step of providing a transfer register for intermediately storing said calculated error syndrome together with allocation identifiers identifying the data to which said error syndromes are allocated, transferring said error syndromes and said identifiers to the main memory of said executive sequencer for intermediate storage via said control bus, and transferring said error syndromes and said identifiers from said executive sequencer to said correction unit for the correction of errors in the data stored in said buffer.

10. Apparatus for controlling error correction within a data processing controller for controlling data read from a disk storage device to a data processing system, comprising, in combination:

a buffer memory connected to receive and store data read from said disk storage device, said buffer memory having a storage capacity corresponding to the maximum quantity of data that can be read from said disk storage device with a single read instruction, protection and correction means connected to receive data from said disk storage device for generating protection characters.

an error syndrome generator, for generating error syndromes corresponding to said protection characters and to in the data stored in said buffer, a syndrome buffer memory connected to said error syndrome generator for intermediately storing said error syndromes;

a vector generator connected to said syndrome buffer memory for generating correction quantities corresponding to said error syndromes, and means for generating timed control signals for controlling said syndrome buffer memory and said vector generator, for intermediately storing said error syndromes and correcting errors in data stored in said buffer memory in accordance with said syndromes.

11. Apparatus according to claim 10, wherein said buffer memory has separate read and write ports, whereby different storage locations within said buffer memory may be simultaneously read from and written to.

* * * * *